April 3, 1956   R. H. PRATT ET AL   2,740,865
THERMOSTAT
Filed April 30, 1952
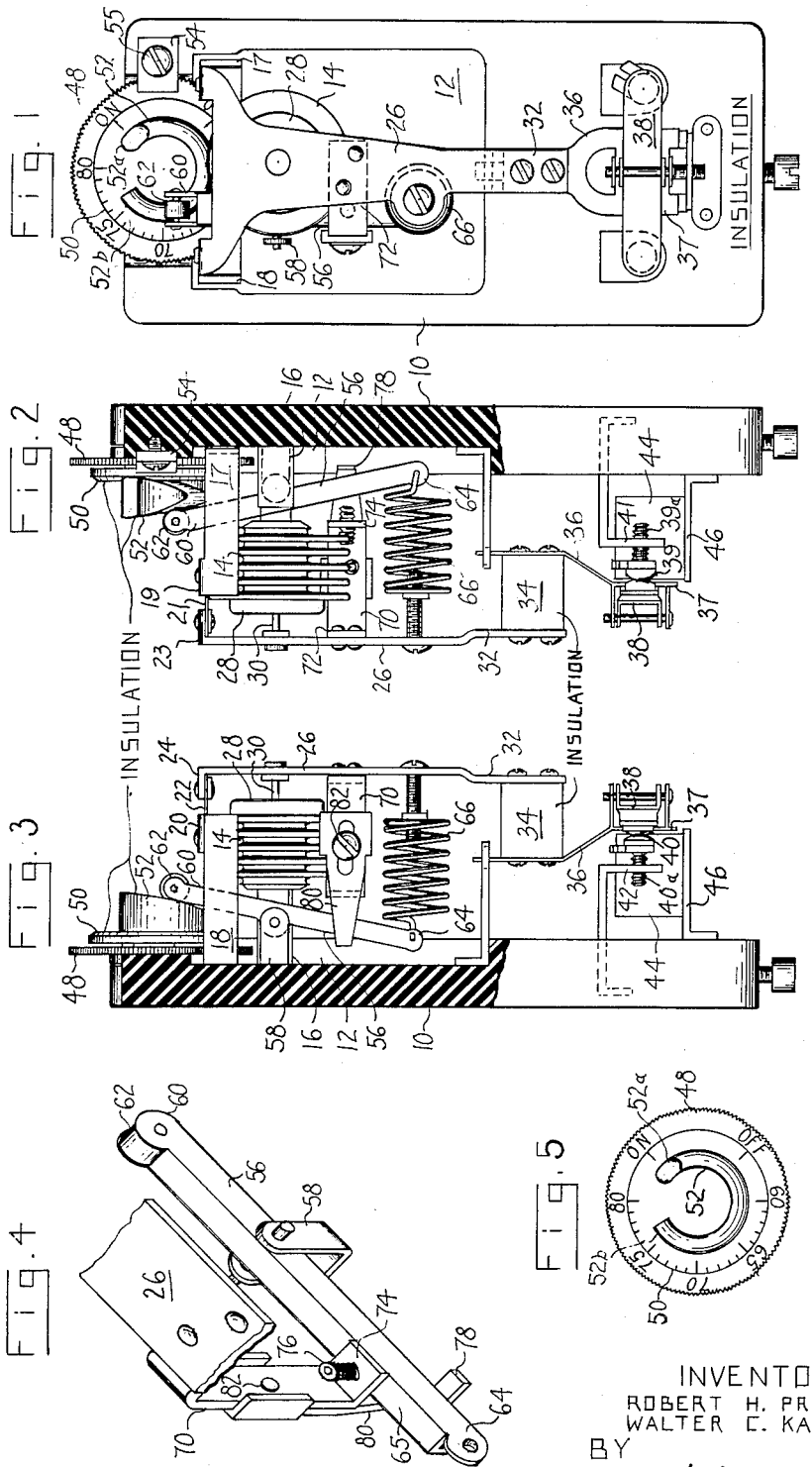
INVENTORS
ROBERT H. PRATT
WALTER C. KARCH
BY
Tate, Weikart & Barr
ATTORNEYS

United States Patent Office 2,740,865
Patented Apr. 3, 1956

2,740,865

THERMOSTAT

Robert H. Pratt, Shorewood, and Walter C. Karch, Milwaukee, Wis., assignors, by mesne assignments, to General Controls Co., a corporation of California Application April 30, 1952, Serial No. 285,277

8 Claims. (Cl. 200—140)

This invention relates to a room thermostat provided with a locked "on" position and/or a locked "off" position.

In many instances the continuous energization or the complete shut-down of a heating system is required to accomplish satisfactory results under abnormal or inconsistent conditions. An object of this invention is to provide a thermostat wherein a manual setting of a graduated dial will allow a fixed and positive operating and non-operating condition of the heating system to be effected. This function is accomplished by the coordinating action between the dial and connected structure affiliated with the thermostat actuating mechanism.

Another object of the invention is to provide optional manual settings that will be unaffected by temperature changes occurring within the room or other enclosure.

As illustrated in the accompanying drawing and explained in the following description, the invention provides a means for locking the thermostat in either operating or non-operating position depending upon the particular requirements of the heating system with the added feature of convertibility to standard thermostat operation.

In the accompanying drawing,

Figure 1 represents a front elevational view of the thermostat, shown with the cover removed;

Figure 2 represents a right side view of the thermostat, shown partly in section;

Figure 3 represents a left side view of the thermostat, shown partly in section;

Figure 4 represents a perspective view of the locking mechanism and its cooperating parts; and Figure 5 represents a front elevational view of the graduated dial and cam surface.

As shown in Figures 1, 2 and 3, the thermostat parts are mounted on an insulation base 10 which may be secured to a wall in a manner and position well known in the art. The base 10 has a recessed portion 12 in which is mounted a condition responsive element, such as a temperature responsive bellows 14, secured to the base by a post 16. This type of bellows 14 responds to ambient temperature changes to actuate a control instrumentality, such as a switch.

A pair of supporting brackets 17 and 18, are fixedly attached to the base portion of recess 12. The outer ends of brackets 17 and 18 have inwardly bent portions 19 and 20 to which are attached the ends of spring hinges 21 and 22, respectively. The opposite ends of hinges 21 and 22 are riveted to downwardly bent portions 23 and 24 of an operating or switch actuating lever 26. Thus, the brackets 17 and 18 form a support means for the hinged lever 26. The spring hinges 21 and 22 permit pivotal movement of the lever 26 about the bent portions 19 and 20.

As shown in Figures 2 and 3, the upper collar 28 of bellows 14 is fastened by an integral shaft 30 to the operating lever 26. The collar 28 translates the movement of the bellows 14, in response to temperature changes, to the shaft 30 and lever 26. Thus, expansion of the bellows 14 (upon an ambient temperature increase) moves the lever 26 and its free end 32 away from the base 10, and contraction of the bellows 14 (upon an ambient temperature decrease) moves the lever 26 and its free end 32 towards the base 10.

The free end 32 of lever 26 is secured to one side of a block 34 of insulation material. A switch arm 36 is secured to the other side of block 34 by means of screws. The free end 37 of arm 36 serves as an armature and a support for a flexible contact bar 38. The contact bar 38 is in a position to engage and electrically connect a pair of fixed contacts 39 and 40, as shown in Figures 2 and 3 in the closed contact position. The contacts 39 and 40 are provided with threaded shanks 39a and 40a for adjustment relative to supporting brackets 41 and 42 to vary the contact positions.

The armature 37 cooperates with a permanent magnet 44 which provides a positive means for opening and closing the contacts with a snap-action. The magnet 44 is secured to a bracket 46 fastened to the base 10.

A graduated dial 48, rotatably mounted on the base 10, has marked indicia thereon to indicate various degrees of temperature and the "on" and "off" settings. A cam disc 50, integral with dial 48 has markings commensurate with the indicia on dial 48. On the surface of disc 50 is a cam surface 52 which rotates with the dial 48 and disc 50. A retaining plate 54, held by screw 55, serves to retain the dial 48 and its components in a manually selected position on the base 10.

A rocker arm 56 is pivotally mounted on a U-shaped bracket 58, secured to the base 10. One end 60 of arm 56 is provided with a roller 62 which rides upon the cam surface 52 and is thereby movable towards and away from the base 10 by the rotation of dial 48. This rotation pivots the arm 56 about the bracket 58 to vary the distance of end 64 from base 10. The end 64 of arm 56 is connected to a coil spring 66. The opposite end of spring 66 is adjustably secured to the switch lever 26. The loading effect of spring 66 on lever 26 is variable by the setting of dial 48 and its effect on rocker arm 56 and end 64. The spring 66 is therefore biased to converge the lever 26 and end 64 by various degrees of force depending upon the setting of dial 48 and cam surface 52.

For a more complete description of the portion of the thermostat heretofore described reference is made to the Patent 2,269,776, issued to H. E. Lindemann and dated January 13, 1942.

The following description has specific reference to the operating parts for the obtainment of the locked "on" and "off" positions. As shown in Figures 1 and 4 a bracket 70 has a leg 72 riveted to the switch lever 26. The other leg 74 extends to a position which is in the path of upward movement of end 64 of arm 56. An adjusting screw 76 is threaded into the leg 74 and provides an adjustable abutment for limiting downward travel (relative) of lever 26 by engaging the arm 56 under a particular pre-set position of the end 64 of arm 56. This position is obtained by manually rotating the dial 48 to the indicia designated "off." In this position the roller 62 rides or engages the shallowest portion 52a (Figure 5) of the cam surface. Thus the end 60 of rocker arm 56 will move closer to the base 10 and at the same time cause end 64 to move away from the base 10 to its extended position. During this movement of rocker arm 56, the upper surface 65 of the end 64 will engage the screw 76 causing the bracket 70 and attached lever 26 to be carried upwardly or away from the base 10. The latter movement of lever 26 will carry the contact bar 38 out of engagement with contacts 39 and 40. In this "off" or open contact position the bellows 14 will be unable to effect switch closing action because contraction of the bellows 14 will cause the lever 26, bracket 70, and screw 76 to bear against the surface 65 of arm 56 and in as much as this abutment has been positioned by the dial 48, no movement of lever 26 towards contact closing position would result. However, it is obvious that an extremely low temperature would result in the lever 26 and bellows 14 overcoming the resistive force of spring 66 and the friction at pivot bracket 58 to raise the roller end 60 away from the cam surface 52 and allow the contacts to close. The "off" position is a relative condition of the thermostat, i. e. it provides an open position within a wide temperature range which for practical applications constitutes a fixed setting, and the contacts will close only on the unusual occurrence of a low temperature, such as 20°, which during the period when an "off" setting would most likely be used, such as in summer, would not be likely to occur. Obviously, expansion of bellows 14 would also maintain the contacts in open or "off" position. Thus, with a manual setting in the "off" position, the thermostat is rendered ineffective as to its usual automatic operation and maintains the contact structure in a locked "off" position irrespective of ambient temperature changes except to an unusual degree of change.

To effect the locked "on" position, the dial 48 is manually rotated to the indicia designated "on." This movement causes the highest point 52b of the cam surface 52 to engage the roller 62, pivoting the rocker arm 56 so that end 64 approaches the base 10. In this position the end 64 engages a shelf 78 which is the leg portion of an L-shaped bracket 80. As shown in Figures 3 and 4, the bracket 80 is adjustably secured to the bracket 70. The engagement of the end 64 of arm 56 with the shelf 78 causes the switch lever 26 to move the contacts 38—39—40 into their closed positions. This action is aided by the spring 66. Ordinarily, in automatic operation, the expansion of bellows 14 would overcome the biasing action of spring 66 to open the contacts 38—39—40, but this expansion is now restrained by the shelf 78 which coupled with the switch lever 26 contains the bellows 14 within the area between the closed contact position of lever 26 and the base 10. Note, that in Figure 2 a slight space is shown between the shelf 78 and end 64 of arm 56. In the "on" position the shelf 78 would abut the arm 56 at that point and prevent further movement of lever 26 away from the base 10. Thus, a locked "on" position of contacts 38—39—40 is obtained which is unaffected by ambient temperature changes. In Figures 3 and 4 it is to be noted that an adjusting screw 82 is provided to permit relative adjustments between bracket 70 and bracket 80 to be made, for purposes of calibration of the "on" position.

Obviously either the bracket 80 and its shelf 78 or the leg 74 and its screw 76 may be omitted to provide a thermostat having the single feature of either locked "on" or locked "off" positions as is desired.

The invention accomplishes its locking purpose, not by any abrupt cam contour changes as in conventional thermostats, but by holding or preventing movement of the switch lever 26 beyond the limits set by the dial 48, cam 52, and arm 56. From these limiting positions (either "off" or "on") bi-directional movement of the bellows 14 will not alter the selected position. The versatility of the instrument also enables automatic thermostat action to be obtained independently of the locked limiting positions under conditions of normal operation of the heating system.

What is claimed is:

1. In a condition responsive device, a base, a condition responsive element mounted on said base, a control instrumentality actuating lever pivotally mounted on said base and moveable by said element, a bracket carried by said lever and preventing movement of said lever beyond predetermined limiting positions, and a manually positionable member for engaging said bracket to establish said limiting positions.

2. In a condition responsive device, a base, a condition responsive element mounted on said base, a control instrumentality actuating lever pivotally mounted on said base and moveable by said element between a first and second position, a rocker arm pivotally mounted on said base and manually moveable through a range of positions, said arm having an operative connection with said lever, and a bracket associated with said lever and engageable with said rocker arm in at least one position of said arm to prevent movement of said lever between its said first and second positions.

3. In a thermostatic device, a base, a thermostatic element mounted on said base, a switch mounted on said base, a switch actuating lever pivotally mounted on said base and moveable by said element, a rocker arm pivotally mounted on said base and operatively connected to said lever, an adjusting means for positioning said arm in relation to said lever, and a bracket attached to said lever and engageable with said rocker arm in at least one position of said arm to restrain movement of said lever from one switch actuating position to another.

4. A control mechanism comprising a base, an operating lever, means for hingedly supporting said lever on the base, condition responsive means for moving said lever, flexible means opposing the action of the condition responsive means in one direction, means on the base remote from the flexible means for adjusting the same, a rocker arm pivoted on the base connecting the flexible means to the adjusting means, and an abutment on said lever engageable with said rocker arm in at least one position of said arm to restrain movement of said lever from one operating position to another.

5. A thermostatic switch comprising a base, a switch on said base, an operating lever hingedly mounted on said base for operating said switch, a thermostatic means on said base for moving said lever, adjustable biasing means for said lever, and a bracket secured to said lever and having a portion engageable with said biasing means in at least one position of said biasing means whereby said operating lever is locked in position and unable to effect switch operating action.

6. A thermostatic switch having a plurality of operating positions including locked "on" and locked "off" positions, comprising a base, an operating lever hingedly mounted on said base, a switch operated by said operating lever, a thermostatic means operatively connected to said lever, an adjustable biasing means connected to said operating lever to bias said lever in one direction, and a bracket secured to said lever having a portion engageable with said biasing means to prevent movement of said lever in said one direction when a locked "off" position is required and said bracket having another portion engageable with said biasing means to prevent movement of said lever in another direction when a locked "on" position is required.

7. A control mechanism including a base, an operating lever, means for hingedly supporting said lever on the base, condition responsive means for pivotally moving said lever, an arm pivoted intermediate its ends on said base, an adjusting spring extending between one end of said arm and the operating lever for opposing mevement of said lever by said condition responsive means in one direction, a cam member engaged by the other end of said arm and moveable to thereby adjust the position of said arm and consequently the tension of said spring a bracket carried by said lever and having a portion engageable by said arm in at least one position of said arm to limit the amount of movement of said lever by the condition responsive means.

8. A control mechanism including a base, an operating lever, means for hingedly supporting said lever on the base, a temperature responsive element having a portion moveable in response to temperature changes mounted on said base and adapted to pivotally move said lever, an arm underlying said lever and pivoted intermediate its ends on said base, an adjusting spring extending between one end of said arm and the operating lever for opposing movement of said lever by said temperature responsive element in one direction, a cam member engaged by the other end of said arm and manually moveable to thereby adjust the position of said arm and consequently the tension of said spring, a bracket carried by said lever and having a first portion engageable by said arm on the side nearest said lever and having a second portion engageable by said arm on the side furthest from said lever, said portions cooperating with said arm to limit the amount of movement of said lever by the temperature responsive means, and a calibration adjusting connection between said second portion and the bracket for adjustably varying the relative position of said portions.

References Cited in the file of this patent
UNITED STATES PATENTS

| | | |
|---|---|---|
| 1,666,192 | Bolling | Apr. 17, 1928 |
| 2,269,776 | Lindemann | Jan. 13, 1942 |
| 2,385,823 | Malone | Oct. 2, 1945 |
| 2,425,447 | Wagner | Aug. 12, 1947 |
| 2,465,664 | Sivley | Mar. 29, 1949 |
| 2,620,414 | Thorsheim | Dec. 2, 1952 |